(12) United States Patent
Canal et al.

(10) Patent No.: US 12,304,422 B2
(45) Date of Patent: May 20, 2025

(54) ANTI-THEFT ALARM DEVICE FOR WHEELS / TIRES OF VEHICLES

(71) Applicant: Telecom Italia S.p.A., Milan (IT)

(72) Inventors: Gianni Canal, Turin (IT); Ivano Salvatore Collotta, Turin (IT)

(73) Assignee: Telecom Italia S.p.A., Milan (IT)

( * ) Notice: Subject to any disclaimer, the term of this patent is extended or adjusted under 35 U.S.C. 154(b) by 80 days.

(21) Appl. No.: 18/037,727

(22) PCT Filed: Nov. 15, 2021

(86) PCT No.: PCT/EP2021/081680
§ 371 (c)(1),
(2) Date: May 18, 2023

(87) PCT Pub. No.: WO2022/106353
PCT Pub. Date: May 27, 2022

(65) Prior Publication Data
US 2023/0415700 A1    Dec. 28, 2023

(30) Foreign Application Priority Data
Nov. 19, 2020   (IT) .................. 102020000027786

(51) Int. Cl.
*B60R 25/102*  (2013.01)
*B60R 25/32*   (2013.01)
*B60R 25/33*   (2013.01)

(52) U.S. Cl.
CPC ............ *B60R 25/102* (2013.01); *B60R 25/32* (2013.01); *B60R 25/33* (2013.01)

(58) Field of Classification Search
CPC ....... B60R 25/102; B60R 25/32; B60R 25/33; B60R 25/1001; B60C 23/0486; B60C 23/0488
See application file for complete search history.

(56) References Cited

U.S. PATENT DOCUMENTS

2008/0272897 A1\*  11/2008  Honkonen .......... B60R 25/1004
                                                                340/429
2010/0274441 A1\*  10/2010  Carresjo ............. G01M 17/013
                                                                701/31.4

(Continued)

FOREIGN PATENT DOCUMENTS

| EP | 3733430 A1 | 11/2020 |
| JP | 2019-137221 A | 8/2019 |
| WO | 2016/151544 A1 | 9/2016 |

OTHER PUBLICATIONS

Jan. 26, 2022—(WO) International Search Report and Written Opinion of the ISA—WO PCT/EP2021/081680.

*Primary Examiner* — An T Nguyen
(74) *Attorney, Agent, or Firm* — Banner & Witcoff, Ltd.

(57) ABSTRACT

An anti-theft alarm device adapted to be associated to a wheel or a tire of a vehicle is provided. The anti-theft alarm device comprises kinetic sensors configured to detect movements of the wheel or tire where the anti-theft alarm device is installed, and a communication interface configured for communicating over a mobile communication network to transmit data related to the detected movements of the wheel or tire detected by the kinetic sensors. A system is also disclosed, comprising at least one anti-theft alarm device and a remote server in communication relationships with the at least one anti-theft alarm device.

20 Claims, 7 Drawing Sheets

(56) References Cited

U.S. PATENT DOCUMENTS

| | | | |
|---|---|---|---|
| 2012/0126967 A1* | 5/2012 | McCormick | B60C 23/0408 |
| | | | 340/445 |
| 2014/0309860 A1* | 10/2014 | Paulin | B60R 25/102 |
| | | | 73/146 |
| 2015/0193992 A1* | 7/2015 | Kumar | G07C 5/0808 |
| | | | 701/29.2 |
| 2015/0314752 A1* | 11/2015 | Shigetomi | B60C 23/0479 |
| | | | 340/426.18 |
| 2015/0321640 A1* | 11/2015 | Hisada | B60R 25/1004 |
| | | | 340/426.2 |
| 2017/0057461 A1* | 3/2017 | Gaskin | G08B 21/0269 |
| 2019/0064027 A1* | 2/2019 | Leone | G07C 5/0841 |
| 2019/0135231 A1* | 5/2019 | Sakuma | B60R 25/305 |
| 2020/0001828 A1* | 1/2020 | Loeffler | B60C 23/06 |
| 2020/0074061 A1* | 3/2020 | Kim | H04L 9/0891 |
| 2020/0134942 A1* | 4/2020 | Root | B60C 23/131 |
| 2020/0247359 A1* | 8/2020 | Murray | G06N 20/00 |
| 2021/0125428 A1* | 4/2021 | Tedesco | G07C 5/0808 |
| 2021/0142598 A1* | 5/2021 | Sethi | G07C 5/0816 |

* cited by examiner

ANTI-THEFT ALARM DEVICE FOR WHEELS / TIRES OF VEHICLES

BACKGROUND

Technical Field

The present disclosure relates to the automotive field. In particular, the solution disclosed in the present document relates to an alarm system embedded in tires and/or wheels of vehicles to protect against theft of vehicle tires or wheels (e.g., wheel rims).

Overview of the Related Art

Theft of vehicle wheels or tires from storages of vendors or distributors or garages of private owners, or directly from vehicles cause huge economic losses.

Securing the vehicle wheels mechanically to fastening structures or using anti-theft bolts for e.g. mounting the wheels to the wheel hubs is not always an adequate solution, since these mechanisms can be broken or opened by keys or special tools.

Other known anti-theft alarm systems are not based on mechanical structures, but they are based on wireless systems for determining the kinetic state information of the tires and executing alarm functions, if inconsistent movements are revealed. For example, US 2008/0272897 discloses an anti-theft alarm system for vehicle wheels, comprising at least one wireless measuring module for determining kinetic state information characterizing the kinetic state of a vehicle wheel on the basis of acceleration measurement. The wireless measuring module is configured to be attached to the vehicle wheel, to generate a wireless data transfer signal on the basis of the kinetic state information and transmit the wireless data transfer signal. The system further comprises at least one wireless central processing unit, which is configured to receive the wireless data transfer signal and execute a predetermined alarm function when the wireless data transfer signal fulfils predetermined conditions.

SUMMARY

The Applicant has observed that the known alarm systems for wheels/tires, like the one disclosed in US 2008/0272897, require a central processing unit installed in the vehicle or in storage spaces of the wheels/tires to receive the kinetic state information of the tires and to execute alarm functions, when predetermined conditions are fulfilled.

The Applicant believes that the need of providing a central processing unit on-board the vehicle and/or in wheels/tires storage spaces is disadvantageous.

The Applicant has tackled the problem of devising an alternative solution to the known alarm systems for wheels/tires.

According to an aspect of the solution disclosed herein, an anti-theft alarm device is provided.

The anti-theft alarm device is adapted to be associated to a wheel or a tire of a vehicle.

The anti-theft alarm device comprises kinetic sensors configured to detect movements of the wheel or tire where the anti-theft alarm device is installed.

The anti-theft alarm device comprises a communication interface configured for communicating over a mobile communication network to transmit data related to the detected movements of the wheel or tire detected by the kinetic sensors.

The anti-theft alarm device may in particular be adapted to be embedded in a tire of a vehicle.

The kinetic sensors may be configured to detect translation movements of the wheel or tire where the anti-theft alarm device is installed.

In particular, the kinetic sensors may comprise an accelerometer.

In embodiments, the kinetic sensors may be further configured to detect rotational movements of the wheel or tire where the anti-theft alarm device is installed.

For example, the kinetic sensors may comprise a gyroscope.

Preferably, the anti-theft alarm device may further comprise a receiver of signals irradiated by satellite transmitters of a satellite global positioning system.

In embodiments, the anti-theft alarm device may comprise a data processor programmed to execute a data processing algorithm for processing the data provided by the kinetic sensors to discriminate between a condition of coherent movement of the wheel or tire and a condition of non-coherent movement of the wheel or tire based on the movements detected by the kinetic sensors. A condition of coherent movement is a condition of movement expected in the normal use of the wheel or tire, whereas a condition of non-coherent movement is a condition of movement not expected in the normal use of the wheel or tire. The data related to the detected movements of the wheel or tire transmitted over the mobile communication network can include an alarm message/notification in case a condition of non-coherent movement of the wheel or tire is detected.

Advantageously, the communication interface may comprise a NarrowBand-IOT communication interface.

According to another aspect of the solution disclosed herein, a vehicle wheel comprising a wheel rim fitted with a tire is provided, comprising, embedded in the tire and/or mounted to the wheel rim, an anti-theft alarm device in accordance with the previous aspect of the disclosed solution.

According to still another aspect, an anti-theft alarm system is provided. The anti-theft alarm system comprises at least one anti-theft alarm device in accordance with the first aspect of the solution disclosed herein, and a remote server in communication relationship with the at least one anti-theft alarm device. The remote server is configured to execute an alarm application for receiving from the at least one anti-theft alarm device the data related to the detected movements of the wheel or tire and for issuing alarm notifications of theft based on the received data related to the detected movements of the wheel or tire.

According to still another aspect, an anti-theft alarm system is provided. The anti-theft alarm system comprises at least one anti-theft alarm device in accordance with the first aspect of the solution disclosed herein, and a remote server in communication relationship with the at least one anti-theft alarm device. The remote server is configured to execute an alarm application for receiving from the at least one anti-theft alarm device the data related to the detected movements of the wheel or tire and for issuing alarm notifications of theft based on the received data related to the detected movements of the wheel or tire. The remote server is also configured to execute a data processing algorithm for processing the data related to the detected movements of the wheel or tire received from the at least one anti-theft alarm device to discriminate between a condition of coherent movement of the wheel or tire and a condition of non-coherent movement of the wheel or tire based on the movements detected by the kinetic sensors of the at least one anti-theft alarm device.

An aspect of the invention is an Internet of Things (IoT) anti-theft device for protecting vehicle wheels/tires against theft.

Thanks to the solution disclosed herein, differently from known solutions, a wireless central processing unit in the vehicle or in the nearby (e.g. in storage spaces of the wheels/tires) is no longer required. The entire IoT anti-theft device, installed for example in the tread of the tire or in the wheel (e.g. in the wheel rim), communicates, over a mobile communication network like a 4G, 5G or higher generation mobile communication network, directly with a remote server supervising, in case a (suspected) theft is determined, the issuance of alarm notification and possibly the undertaking of suitable countermeasures.

The communication of the anti-theft alarm device through a mobile communication network like a 4G (e.g., LTE— Long Term Evolution—mobile network), 5G or higher generation network can for example be based on NB-IoT (Narrow Band IoT, an LTE-based efficient and cost-effective technology), thus keeping low the total cost of the solution.

Advantageously, since the IoT anti-theft device can be realized in small size, it could be accommodated (e.g., embedded in, or fixed, for example glued) inside the rubber of a tire. Since it can be accommodated in the rubber of the tire, the IoT anti-theft device cannot be manipulated, damaged or even eliminated.

The IoT anti-theft device may also equipped with a receiver of signals irradiated by satellite transmitters of a global positioning system (a Global Navigation Satellite System—GNSS—like the GPS, the Galileo or the GLONASS). In this case, each tire or wheel can transmit the GPS position of the IoT anti-theft device associated therewith and, consequently, of the wheel/tire, which makes it easier to find the stolen wheel/tire in case of theft.

The solution disclosed herein, being based on an anti-theft alarm device that can be mounted in each wheel or tire and not requiring other units/device in the vehicle, or in the nearby, can enable value added services and business for tire or wheel (e.g., wheel rims) vendors, which do not need to make agreements with car manufactures or insurance companies (who for example usually install insurance boxes on the vehicles as a part of the insurance contract), in order to provide tire theft protection services.

BRIEF DESCRIPTION OF THE DRAWINGS

The features and advantages mentioned in the foregoing, as well as other features and advantages of the solution disclosed in the present document, will more clearly appear by reading the following detailed description of exemplary and non-limitative embodiments thereof. For better intelligibility, the following description should be read making reference to the annexed figures, in which.

DETAILED DESCRIPTION

The solution disclosed herein relates to an alarm system including a theft-protection or anti-theft alarm device adapted to be embedded in vehicle wheels or tires (e.g., in every single vehicle tire or in every single vehicle wheel, for example in the wheel rim) to protect vehicle tires or wheels (e.g., wheel rims) against theft.

Figure 1:
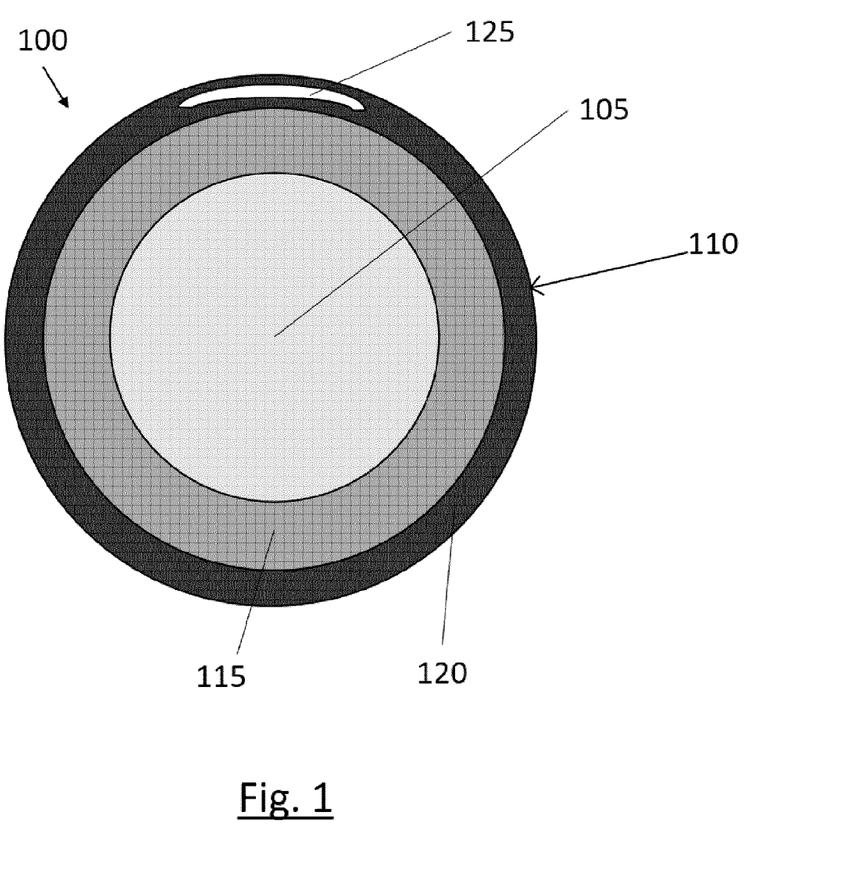
FIG. 1 pictorially shows a vehicle wheel equipped with a theft-protection or anti-theft alarm device according to an embodiment of the solution disclosed herein.

In FIG. 1 a vehicle wheel 100 is pictorially depicted. The wheel 100 can be any kind of wheel for any kind of vehicle, either motorized or not (by an internal combustion engine or/and an electric engine), like a car, a van, a truck, a two-wheeled vehicle like a bike, an e-bike or a motorbike, a three-wheeled vehicle.

The wheel 100 comprises a wheel rim 105, fitted on which is a tire 110 comprising sidewalls 115 and a tread 120.

The wheel 100 is equipped with an anti-theft alarm device 125. In the shown, non-limitative example the anti-theft alarm device 125 is provided in, e.g., embedded in, the tire 110. In the exemplary embodiment here considered, the anti-theft alarm device 125 is embedded in the tread 120 of the tire 110. In other embodiments, the anti-theft alarm device 125 may be mounted to the wheel rim 105. In embodiments, anti-theft alarm devices 125 may be provided both in the tire 110 and in the wheel rim 105, to protect each of them individually against theft).

Figure 2:
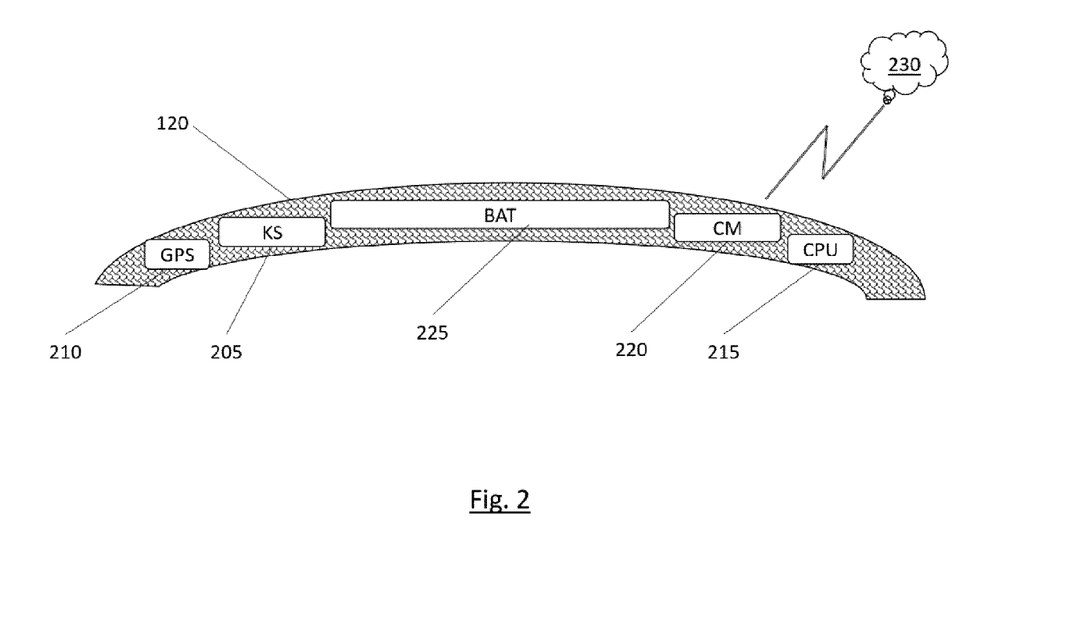
FIG. 2 pictorially shows, in an enlargement view of a detail of FIG. 1, an embodiment of the anti-theft alarm device.

FIG. 2 pictorially shows, in an enlargement view of a detail of FIG. 1, an embodiment of the anti-theft alarm device 125.

In the exemplary embodiment here considered, the anti-theft alarm device 125 comprises a kinetic sensor or system of sensors (KS) 205. The anti-theft alarm device 125 may comprise a receiver for signals from one or more satellite geopositioning systems (Global Navigation Satellite System or GNSS), like a GPS receiver 210 (in the following, the receiver for signals from GNSS satellites is shortly referred to as "GPS receiver"). The anti-theft alarm device 125 may comprise a data processor, e.g. a Central Processing Unit (CPU) 215. The anti-theft alarm device 125 may comprise a communication module (CM) 220. The anti-theft alarm device 125 may comprise a battery/power management unit (BAT) 225.

The kinetic sensor 205 is configured and used for determining information (kinetic state information) about the kinetic state of the wheel 100. Kinetic state information may include one or more of: acceleration in one or more directions, velocity (speed) in one or more directions, rotation velocity (speed) in one or more directions (clockwise, counter clockwise), oscillating frequency in one or more directions.

The kinetic sensor 205 may comprise an accelerometer (e.g. a one-axis, or a two-axis or a three-axis accelerometer, capable of detecting accelerations along one axis, two axes or three axes, respectively).

The kinetic sensor 205 may also comprise or cooperate with a gyroscope. While the accelerometer is capable of detecting linear acceleration (from which information the direction of movement of the tire/wheel can be derived), the gyroscope may be useful for detecting rotational movements (and possibly torsion movements) of the tire/wheel.

The kinetic sensor 205 may also include or cooperate with a tire pressure sensor (not shown in FIG. 2), configured to provide tire pressure information. Information about the tire pressure provided by the tire pressure sensor may be helpful in determining if the wheel 100 is fitted on a vehicle or not.

The kinetic sensor 205 may also include or cooperate with a proximity sensor (not shown in FIG. 2). The proximity sensor may be properly positioned inside the tire and/or in the wheel rim. A proximity sensor positioned in the tire may be helpful to determine if the tire is fitted to the wheel rim or not. A proximity sensor mounted to the wheel rim may be helpful in determining if the wheel is mounted to a vehicle or not (and, e.g., for detecting that the wheel has been dismounted from the vehicle, or the tire has been removed from the wheel rim).

The kinetic sensor 205 may also include or cooperate with a magnetometric sensor (not shown in FIG. 2); information obtained from the magnetometric sensor may be useful for determining the orientation of the anti-theft alarm device (mounted in the tire/wheel) with respect to the earth's magnetic north pole.

The GPS receiver 210 is exploited for determining the GPS (or Galileo, or GLONASS) geographic position of the wheel 100 (or of the tire 110, should the latter be dismounted from the wheel rim 105).

Information provided by the magnetometric sensor (when present) may also be useful in case of absence of GPS signal (for example because the stolen tire 110/wheel 100 has been put in an area where satellite signals cannot be received, and/or has been shielded to prevent the GPS receiver 210 from receiving the satellite signals) to still determine where the stolen tire 110/wheel 100 is being transported.

The anti-theft alarm device 125 may comprise a data processor (CPU) 215 for processing the data acquired through the kinetic sensor 205 and the GPS receiver 210 and, subsequently, based on such processing, for detecting movements of the wheel 100 or tire 110 that are not coherent with the normal movements of the wheels/tires when in use (in the following also referred to as "non-coherent movements"). As described in greater detail subsequently, the detection of non-coherent movements is exploited for revealing a possible theft (and possibly to issue an alarm notification). The data processor 215 may include or be coupled with data memories (e.g., non-volatile data memories, like ROM, working memories, like RAM) used to help the data processing (e.g., non-volatile memories can store a theft detection algorithm to be executed by the data processor 215; working memories can assist the data processor 215 in the execution of the theft detection algorithm).

The communication module 220 comprises wireless communication interfaces, for example based on efficient wireless communication systems/protocols, such as 3GPP-based 2G, 3G, 4G, 5G, NB-IoT, LTE-M, or non 3GPP-based LPWA, W-MBUS, LoRAWAN, Sigfox.

Embodiments of the invention herein described are based on NarrowBand-IOT (NB-IoT, an LTE-based efficient and cost-effective technology; NB-IOT is a Low-Power Wide Area Network—LPWAN—radio technology standard developed by the $3^{rd}$ Generation Partnership Project (3GPP) and defined in 3GPP Release 13—LTE Advanced Pro and subsequent releases), for the transmission of data directly to a remote server, for example using a mobile communication network 230 like a 3G, 4G, 5G or higher generation network. The wireless communication interface may need a Subscriber Identity Module (SIM) for authentication in the mobile communication network. The SIM can be a physical SIM card inserted in a SIM socket provided in the wireless communication interface or a virtual embedded SIM implemented as a software in the wireless communication interface.

The battery/power management unit 225 may for example comprise a button cell battery. The anti-theft alarm device 125 should preferably be designed for extremely low power consumption (since replacement of the battery in a device that is embedded in the tread of a tire should be avoided). Wireless energy transfer mechanisms and/or energy scavenging mechanisms (that convert mechanical movement into electric power) can be used to recharge the battery from the outside of the wheel/tire and/or during the movement of the wheel/tire.

Figure 3:
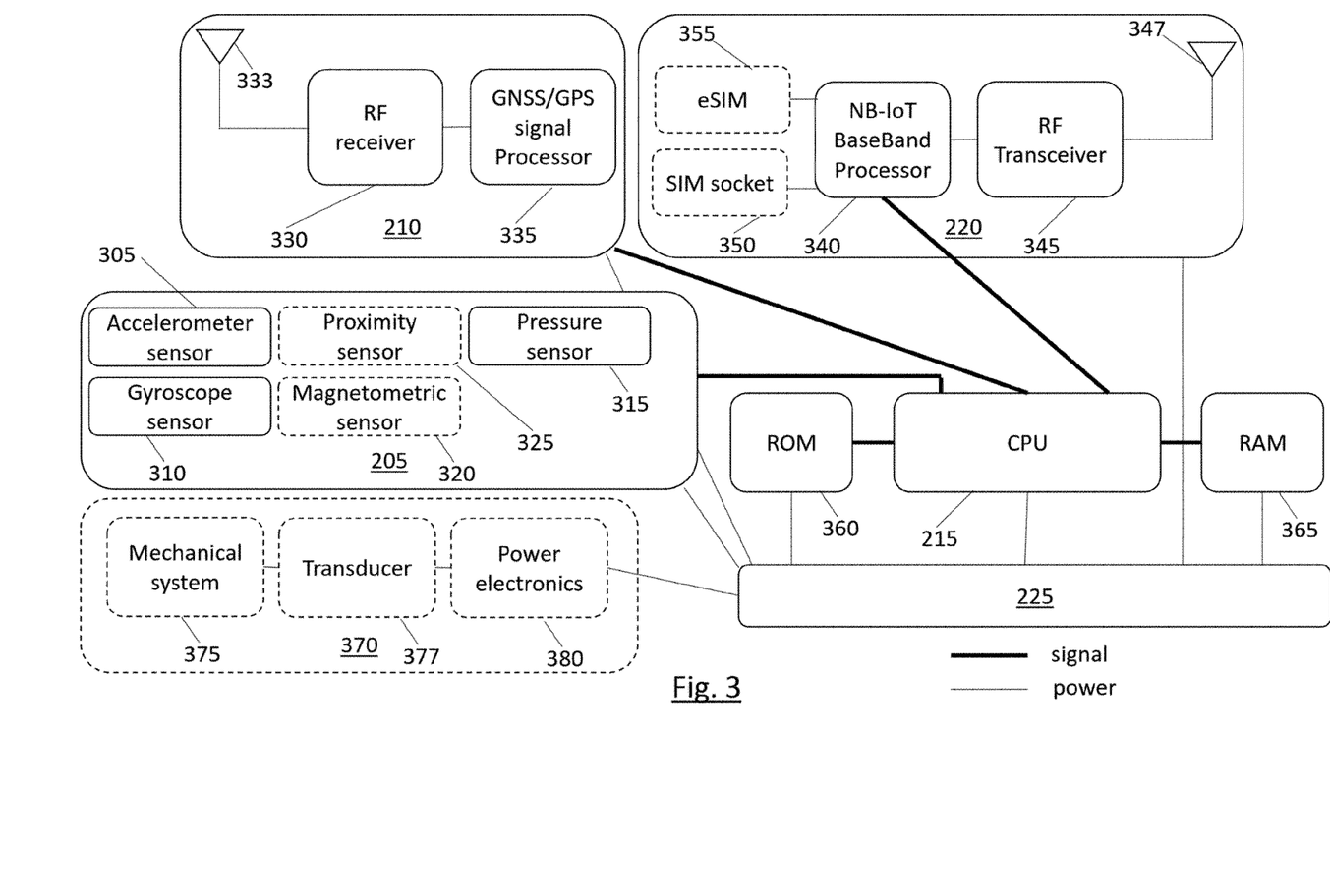
FIG. 3 is a functional blocks diagram of an embodiment of the anti-theft alarm device.

FIG. 3 is a functional blocks diagram of an embodiment of the anti-theft alarm device 125. In the considered exemplary embodiment, the kinetic sensor 205 comprises an accelerometer 305 (e.g. a one-axis, or a two-axis or a three-axis accelerometer, capable of detecting accelerations along one axis, two axes or three axes, respectively).

In the considered exemplary embodiment, the kinetic sensor 205 may comprise a gyroscope 310.

In the considered exemplary embodiment the kinetic sensor 205 may comprise a tire pressure sensor 315. As mentioned in the foregoing, information about the tire pressure provided by the tire pressure sensor 315 may be helpful in determining if the wheel 100 is fitted on a vehicle or not.

In the considered exemplary embodiment the kinetic sensor 205 may further comprise a magnetometric sensor 320. As mentioned in the foregoing, information provided by the magnetometric sensor 320 (when present) may also be useful in case of absence of GPS signal (for example because the stolen tire 110/wheel 100 has been put in an area where satellite signals cannot be received, and/or has been shielded to prevent the GPS receiver 210 from receiving the satellite signals) to still determine where the stolen tire 110/wheel 100 is being transported.

In the considered exemplary embodiment the kinetic sensor 205 may also comprise a proximity sensor 325. As mentioned in the foregoing, the proximity sensor 325 may be properly positioned inside the tire and/or in the wheel rim. A proximity sensor positioned in the tire may be helpful to determine if the tire is fitted to the wheel rim or not. A proximity sensor mounted to the wheel rim may be helpful in determining if the wheel is mounted to a vehicle or not (and, e.g., for detecting that the wheel has been dismounted from the vehicle, or the tire has been removed from the wheel rim).

The GPS receiver 210 comprises a radiofrequency (RF) receiver 330 coupled to an antenna 333 for receiving signals irradiated by satellite transmitters of a constellation of satellites of a geopositioning system (GNSS) like the GPS, and a signal processor 335 for processing the received satellite signals and deriving an estimate of the geographical position of the anti-theft alarm device 125.

The communication module 220 comprises a baseband processor 340, for example of the NB-IOT type, and a radiofrequency (RF) transceiver 345, coupled to an antenna 347. For the authentication and communication with a mobile communication network (like a 4G, a 5G or higher generation mobile communication network), the communication module 220 may comprise a SIM socket 350 for the insertion of a SIM card and/or an embedded (i.e., virtual) SIM module 355, coupled with the baseband processor 340.

Also shown in the functional blocks diagram of FIG. 3 is the data processor (CPU) 215, with associated non-volatile memories (ROM) 360 and working memories (RAM) 365. The kinetic sensor 205, the GPS receiver 210, the (baseband processor 340 of the) communication module 220 are coupled in signal exchange relationship with the data processor (CPU) 215. The data processor 215 interacts with the kinetic sensor 205, the GPS receiver 210, the (baseband processor 340 of the) communication module 220.

The battery/power management unit 225 supplies power to the other units/modules of the anti-theft alarm device 125. A battery charging system 370 (comprising for example energy scavenging devices) is coupled to the battery/power management unit 225 for recharging the battery during movement of the wheel/tire where the anti-theft alarm device 125 is installed. The battery charging system 370 may for example comprise a mechanical system 375 sensitive to mechanical movements, a transducer 377 for converting mechanical movements into electrical energy, and an electronic circuitry (Power electronics) 380 for taking the electrical power generated by the transducer 377 and recharge the battery of the battery/power management unit 225.

Figure 4:
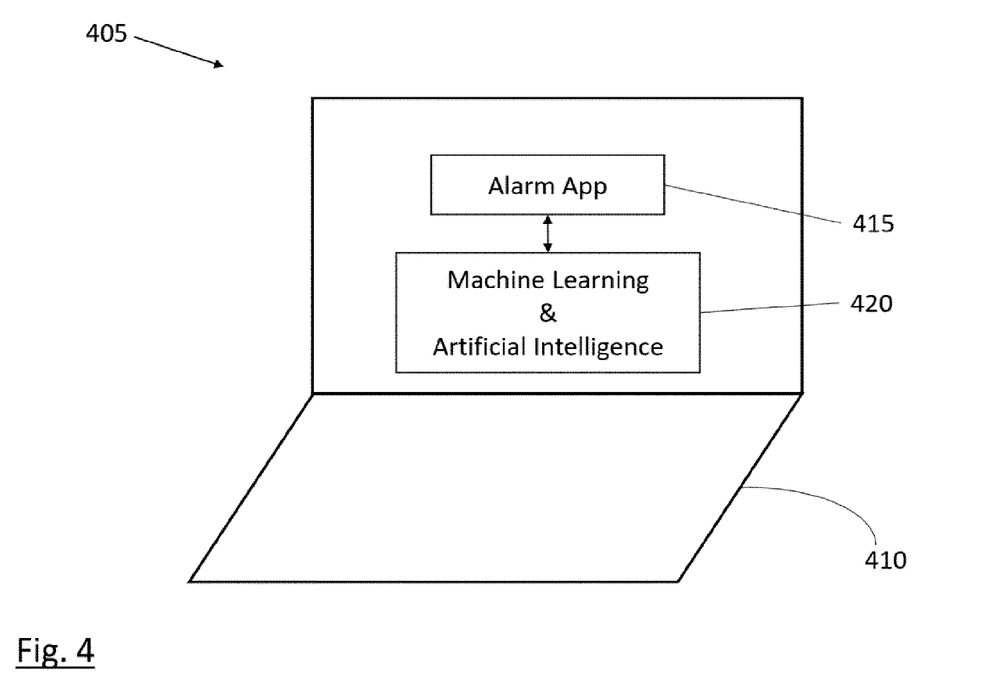
FIG. 4 pictorially shows a (remote) server application interoperating with the anti-theft alarm device of FIG. 3

FIG. 4 schematically shows a remote server 405 in communication relationship (e.g., via an Internet connection 410 to the Internet) with the anti-theft alarm device(s) 125 installed in the wheels/tires (which is/are connected to the Internet via a mobile communication network). The remote server 405 may be programmed to execute an alarm application ("AA") 415.

Alarm notifications/messages transmitted by the (communication module 220 of the) anti-theft alarm device(s) 125 in the wheels/tires can be received by the alarm application 415 running in the remote server 405. The alarm application 415 may, upon receipt of an alarm message/notification from the anti-theft alarm device(s) 125, trigger the issuance of an alarm notification to a user (e.g., the proprietor of the wheel/tire stolen or at risk of theft, for example via an app installed on his/her smartphone; or to a supervisor of an anti-theft surveillance service for which the proprietor of the wheel/tire at risk has a subscription), and/or in general trigger the undertaking of suitable responses and countermeasures to the determined attempt of theft. In case of no determined theft attempts, the alarm application 415 may receive from the anti-theft alarm device(s) 125 periodical keepalive messages that are useful to let the alarm application 415 know that the anti-theft alarm device(s) 125 is (are) working properly. The remote server 405 may implement machine learning algorithms and artificial intelligence 420 for assisting the alarm application 415 performing its functions.

In operation, the anti-theft alarm device 125 of FIG. 3 is capable of detecting non-coherent movements of the wheel 100/rim 105/tire 110 where the anti-theft alarm device 125 is installed. The normal movement of a wheel/tire is to roll on a road, when mounted to a vehicle; this kind of movement can be detected by means of the kinetic sensor 205 (e.g., by the gyroscope 310 and/or the accelerometer 305 comprised in or coupled with the kinetic sensor 205), possibly by means of a processing of the sensing data provided by the kinetic sensor 205. The accelerometer 305 is capable of detecting linear acceleration (from which information the direction of movement of the tire/wheel can be derived). The gyroscope 310 may be useful for detecting rotational movements (and possibly torsion movements) of the tire/wheel. Both information provided by the accelerometer 305 and information provided by the gyroscope 310 are useful to determine coherent movements of the tire/wheel. Coherent movements of the tire/wheel can for example be determined if a linear acceleration is detected by the accelerometer 305 and, at the same time, a rotational movement is detected by the gyroscope 310. If the detection of a linear acceleration (by the accelerometer 305) is not accompanied by a detection of a rotation (by the gyroscope 310), then a non-coherent movement of the tire/wheel can be determined (and an alarm notification/message can possibly be issued). Information about the tire pressure provided by the tire pressure sensor 315 and information provided by the proximity sensor 325 may be helpful in discriminating if, when a non-coherent movement of the wheel/tire is determined, it is likely that such a non-coherent movement derives from a theft or attempt of theft, and thus to issue an alarm notification/message. For example, information from the tire pressure sensor 315 and from the proximity sensor 325 are useful to determine if the wheel is fitted on a vehicle or not: a non-coherent movement determined for a wheel that result to have been dismounted to a vehicle is an indicium that the wheel is being stolen.

The GPS receiver 210, if provided, can notify the change of the geographic position of the wheel 100/tire 110.

In case of a normal rolling of the wheel/tire on a road surface, no anomalous (non-coherent) movement of the wheel/tire is detected by the anti-theft alarm device 125 and no alarm messages need to be notified (to the owner or to an alarm service center).

While rolling (on a road surface) is a normal kind of movement to which wheels/tires undergo, usually wheels/tires do not undergo translational movements. Indeed, small translational movements could be experienced by the front wheels/tires of a vehicle when the vehicle is steering, and when braking, especially if abruptly, e.g. to stop the vehicle. In these cases, the translational movement is detected by the accelerometer 305 provided in the kinetic sensor 205. The detection of such translational movement by the accelerometer 305 can be interpreted as a non-coherent movement and may cause an alarm notification to be issued by the anti-theft alarm device 125. If the GPS receiver 210 is provided in the anti-theft alarm device 125, the estimated position estimated by the GPS receiver can be used to assess that the geographic position of the wheel/tire is not changed. In such a case, no anomalous (non-coherent) movement is detected by the anti-theft alarm device 125 and no "false" alarm messages are notified (to the owner or to an alarm service center). Information provided by the magnetometric sensor 320 may also be useful in case of absence of GPS signal (for example because the stolen tire 110/wheel 100 has been put in an area where satellite signals cannot be received, and/or has been shielded to prevent the GPS receiver 210 from receiving the satellite signals) to still determine where the stolen tire 110/wheel 100 is being transported.

An unusual (i.e., non-coherent) translational movement that can be experienced by the wheels/tires may occur when the vehicle where the wheels/tires are installed is transported by a tow truck. In this case, the translational movement of the wheels/tires is detected by the accelerometer 305 in the kinetic sensor 205 (and the gyroscope sensor 310 does not detect rotation) and the GPS receiver 210, if provided, notifies that the position of the wheel/tire is changing. In this situation, an anomalous (non-coherent) movement will be detected by the anti-theft alarm device 125 and some alarm messages can be notified (to the owner or to an alarm service center). This "false" alarm message, that does not actually correspond to a risk of theft situation, can be tolerated, because the occurrence of a necessity of towing the vehicle is relatively rare and the owner/user of the vehicle is normally aware of what is going on.

An unusual (i.e., non-coherent) translational movement that the wheels/tires undergo is when they are stolen. For example, the wheels can be dismounted from the vehicle, and/or the tires can be disassembled from the wheel rim and brought away. This type of translational movement is detected by the accelerometer 305 of the kinetic sensor 205 (and no rotation is detected by the gyroscope sensor 310). If the wheels/tires are taken away by a thief, the GPS receiver 210 if provided can notify that the position of the wheel/tire is changing (also in this case, information provided by the magnetometric sensor 320 may be useful in case of absence of GPS signal, for example because the stolen tire 110/wheel 100 has been put in an area where satellite signals cannot be received, and/or has been shielded to prevent the GPS receiver 210 from receiving the satellite signals, to still determine where the stolen tire 110/wheel 100 is being transported). In this situation, an anomalous movement will be detected by the anti-theft alarm device 125 and some alarm messages will be notified (to the owner/user or to an alarm service center), useful to make the wheel/tire owner/user aware of the theft and possibly undertaking adequate countermeasures.

Information from the tire pressure sensor 315 about the tire pressure may also be helpful in determining if the wheel 100 is fitted on a vehicle or not.

Information from the proximity sensor 325 may be helpful to determine if the tire is fitted to the wheel rim or not, and/or to determine if the wheel is mounted to a vehicle or not (and, e.g., for detecting that the wheel has been dismounted from the vehicle, or the tire has been removed from the wheel rim).

Figure 5:
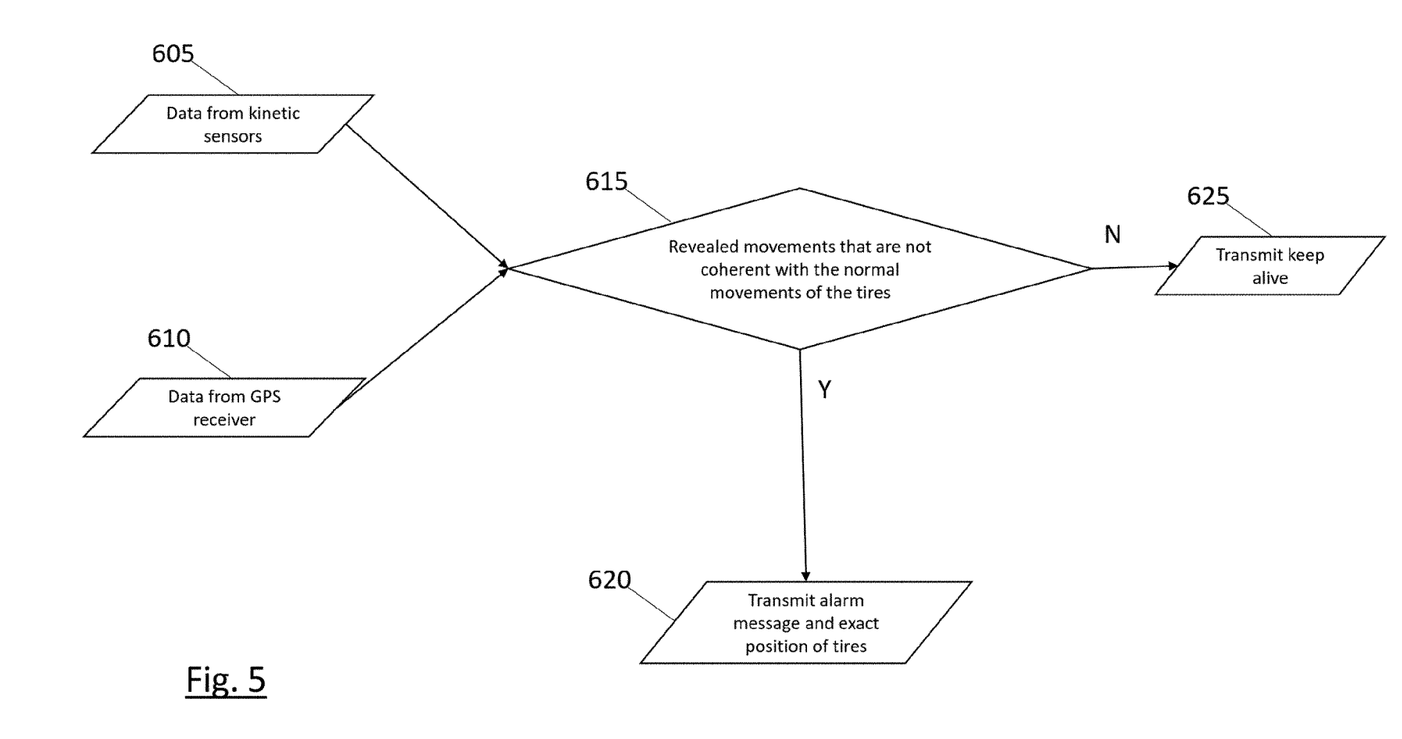
FIG. 5 is a schematic flowchart of some operations of the anti-theft alarm device of FIG. 3.

FIG. 5 is a schematic flowchart of some operations of the anti-theft alarm device 125 of FIGS. 1-3. The data processor (CPU) 215 of the anti-theft alarm device 125 receives data 605 from the kinetic sensor 205 and data 610 from the GPS receiver 210. The data processor (CPU) 215 processes the received data and assesses whether the wheel/tire has experienced non-coherent movements (that are not coherent with the normal movements of the wheels/tires) that can be attributed to a theft (decision block 615). In the affirmative case (exit branch Y of decision block 615), the data processor (CPU) 215 issues to the communication module 220 a command to transmit an alarm message/notification (block 620). The command issued by the data processor (CPU) 215 to the communication module 220 may include (in case the GPS receiver 210 is present) an indication of the geographic position of the anti-theft alarm device 125, i.e., of the wheel/tire where the anti-theft alarm device 125 is installed. In the negative case (exit branch N of decision block 615), i.e. when the data processor (CPU) 215 determines that the wheel/tire has not experienced non-coherent movements (that are not coherent with the normal movements of the wheels/tires) that can be attributed to a theft, the data processor (CPU) 215 may issue to the communication module 220 a command to transmit a "keepalive" message. The procedure just described can be repeated on a periodical basis. In case no non-coherent movements of the wheels/tires are determined, periodical keepalive messages can be transmitted by the anti-theft alarm device 125.

The messages transmitted by the (communication module 220 of the) anti-theft alarm device 125 can be received by the alarm application 415 running on the remote server 405. The alarm application 415 running on the remote server 405, upon receipt of an alarm message/notification from the anti-theft alarm device 125, may trigger the issuance of an alarm notification to a user (e.g., the owner/user of the wheel/tire at risk of theft, for example via an app installed on his/her smartphone; or to a supervisor of an anti-theft surveillance service for which the proprietor of the wheel/tire at risk has a subscription), and/or in general to trigger the undertaking of suitable responses and countermeasures to the determined attempt of theft. In case of no determined theft attempts, the alarm application 415 running on the remote server receives the periodical keepalive messages that are useful to let the alarm application 415 know that the anti-theft alarm device 125 is working properly.

Figure 6:
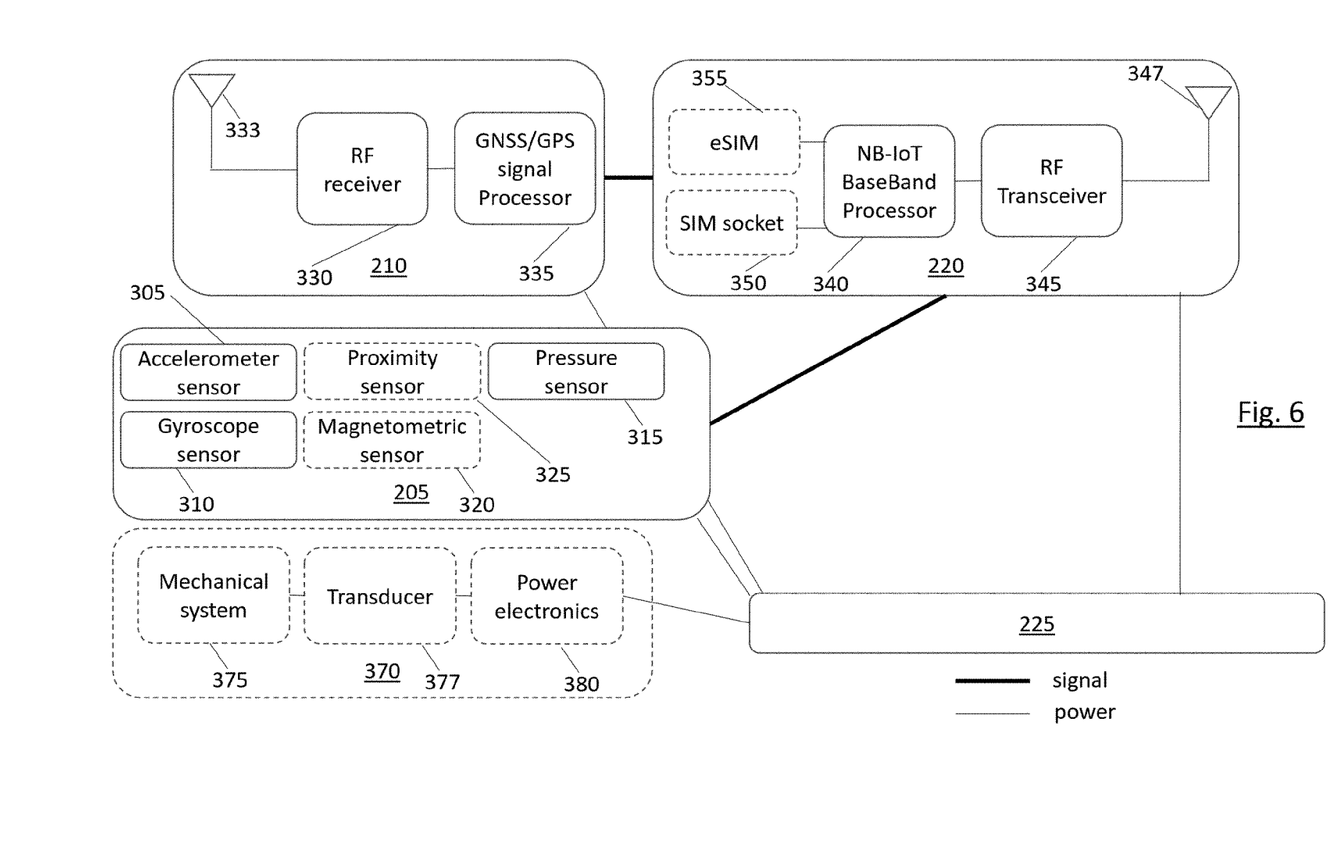
FIG. 6 is a functional blocks diagram of another embodiment of the anti-theft alarm device.
Figure 7:
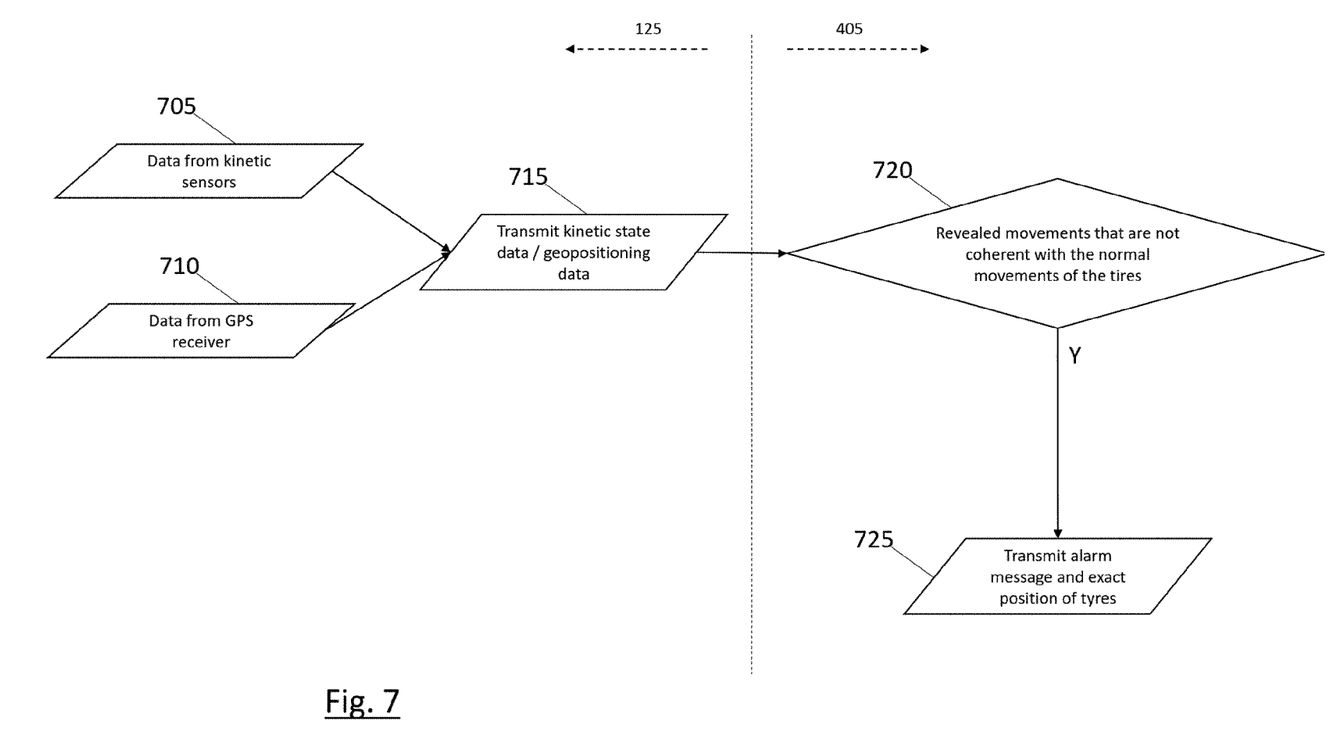
FIG. 7 is a schematic flowchart of some operations of the anti-theft alarm device of FIG. 5 and of the server application of FIG. 4.

FIG. 6 is a functional blocks diagram of another embodiment of the anti-theft alarm device 125. Same reference numerals as in FIG. 3 are used to denote identical or similar structural/functional parts. FIG. 7 is a schematic flowchart of some operations of the anti-theft alarm system comprising an anti-theft alarm device as in FIG. 6 and the remote server 405.

A difference between the embodiment of FIG. 3 and the embodiment of FIG. 6 of the anti-theft alarm device 125 is that in the latter no data processor (CPU) 215 (with associated non-volatile memories—ROM—360 and working memories—RAM —365) is provided in the anti-theft alarm device 125. In such a case, the anti-theft alarm device 125 does not perform (or essentially does not perform) any (significant) pre-processing of data coming from the kinetic sensor 205 and the GPS receiver 210, most of the data processing being performed by the alarm application 415 running on the remote server. The kinetic sensor 205 interfaces directly with the communication module 220. Data 705 from the kinetic sensor 205 and data 710 from the GPS receiver 210 are provided to the communication module 220, that transmits (block 715) the kinetic state data and the geopositioning data to the remote server 405. The alarm application 415 in the remote server 405 processes the received data to determine whether the wheel/rim/tire where the anti-theft alarm device 125 is installed has undergone non-coherent movements (block 720) and, in the affirmative case, the alarm application 415 may trigger the issuance (block 725) of an alarm notification to a user (e.g., the proprietor of the wheel/rim/tire at risk of theft, for example via an app installed on his/her smartphone; or to a supervisor of an anti-theft surveillance service for which the proprietor of the wheel/tire at risk has a subscription), and/or in general to trigger the undertaking of suitable responses and countermeasures to the determined attempt of theft. In order to determine whether the wheel/rim/tire where the anti-theft alarm device 125 is installed has undergone non-coherent movements based on the data received from the kinetic sensor 205 and from the GPS receiver 210, the remote server 405 may use machine learning algorithms and artificial intelligence (denoted as 420 in FIG. 4) to improve the performance of theft detection, learning the behaviour of the user/owner of the wheel/rim/tire (or of the vehicle where the wheel/rim/tire is mounted) and minimizing the false positive alarms. Another mean to improve the performance of theft detection, in case the user has registered more than one wheel/rim/tire to theft service, for example two or more wheels/rims/tires of a vehicle of the user, is to compare the movements of all the wheels/rims/tires of the vehicle. This comparison will increase the confidence on the truthfulness of the detected movement.

The communication module 220 may periodically transmit to the alarm application 415 "keepalive" messages to let the alarm application 415 know that the anti-theft alarm device 125 is working properly, or the alarm application 415 may periodically poll the anti-theft alarm device 125 to receive an "alive" message.

The IoT tire anti-theft protection device could be drowned in each single wheel/tire with no need of external units (installed in the vehicle or in the nearby, e.g. in in storage spaces of the wheels/tires) for the detection of theft incidents. Since the IoT tire anti-theft protection device can be accommodated in the tire rubber, this prevents the possibility to be manipulated, damaged or even eliminated.

Moreover, each wheel/tire can transmit the GPS position to ease the finding in case of theft.

The invention claimed is:

1. An anti-theft alarm device adapted to be associated to a wheel, a rim, or a tire of a vehicle, the anti-theft alarm device comprising:
    kinetic sensors configured to detect movements of the wheel, rim, or tire where the anti-theft alarm device is installed;
    a communication interface configured for transmitting, over a mobile communication network, data related to the detected movements of the wheel, rim, or tire detected by the kinetic sensors; and
    a data processor programmed to execute a data processing algorithm for processing the data provided by the kinetic sensors to discriminate between a condition of coherent movement of the wheel or tire and a condition of non-coherent movement of the wheel or tire based on the movements detected by the kinetic sensors,
    wherein the condition of coherent movement is a condition of movement expected in normal use of the wheel, rim or tire and the condition of non-coherent movement is a condition of movement not expected in the normal use of the wheel, rim, or tire, the data related to the detected movements of the wheel, rim, or tire being suitable for being transmitted over the mobile communication network and including an alarm message/notification in case a condition of non-coherent movement of the wheel, rim or tire is detected.

2. The anti-theft alarm device of claim 1, wherein the anti-theft alarm device is adapted to be embedded in a tire of a vehicle.

3. The anti-theft alarm device of claim 1, wherein the kinetic sensors are configured to detect translation movements of the wheel, rim, or tire where the anti-theft alarm device is installed.

4. The anti-theft alarm device of claim 3, wherein the kinetic sensors comprise an accelerometer.

5. The anti-theft alarm device of claim 1, wherein the kinetic sensors are further configured to detect rotational movements of the wheel, rim, or tire where the anti-theft alarm device is installed.

6. The anti-theft alarm device of claim 5, wherein the kinetic sensors comprise a gyroscope.

7. The anti-theft alarm device of claim 1, further comprising a receiver of signals irradiated by satellite transmitters of a satellite global positioning system.

8. The anti-theft alarm device of claim 1, wherein the communication interface comprises a NarrowBand-IOT communication interface.

9. A vehicle wheel comprising a wheel rim fitted with a tire, comprising the anti-theft alarm device according to claim 1, wherein the anti-theft alarm device is embedded in the tire and/or mounted to the wheel rim.

10. An anti-theft alarm system comprising:
    at least one anti-theft alarm device adapted to be associated to a wheel, a rim, or a tire of a vehicle, the anti-theft alarm device comprising
    kinetic sensors configured to detect movements of the wheel, rim, or tire where the anti-theft alarm device is installed, and
    a communication interface configured for transmitting, over a mobile communication network, data related to the detected movements of the wheel, rim, or tire detected by the kinetic sensors; and
    a remote server in communication with the at least one anti-theft alarm device, wherein the remote server is configured to execute an alarm application for receiving from the at least one anti-theft alarm device the data related to the detected movements of the wheel, rim, or tire and for issuing alarm notifications of theft based on the received data related to the detected movements of the wheel, rim, or tire.

11. An anti-theft alarm system comprising:
    at least one anti-theft alarm device adapted to be associated to a wheel, a rim, or a tire of a vehicle, the anti-theft alarm device comprising
    kinetic sensors configured to detect movements of the wheel, rim, or tire where the anti-theft alarm device is installed, and
    a communication interface configured for transmitting, over a mobile communication network, data related to the detected movements of the wheel, rim, or tire detected by the kinetic sensors; and
    a remote server in communication with the at least one anti-theft alarm device, wherein the remote server is configured to execute an alarm application for receiving, from the at least one anti-theft alarm device, the data related to the detected movements of the wheel or tire and for issuing alarm notifications of theft based on the received data related to the detected movements of the wheel or tire, wherein the remote server is configured to execute a data processing algorithm for processing the data related to the detected movements of the wheel or tire received from the at least one anti-theft alarm device to discriminate between a condition of coherent movement of the wheel or tire and a condition of non-coherent movement of the wheel or tire based on the movements detected by the kinetic sensors of the at least one anti-theft alarm device, a condition of coherent movement being a condition of movement expected in normal use of the wheel or tire and a condition of non-coherent movement being a condition of movement not expected in the normal use of the wheel or tire.

12. The anti-theft alarm system of claim 10, wherein the anti-theft alarm device is adapted to be embedded in a tire of a vehicle.

13. The anti-theft alarm system of claim 10, wherein the kinetic sensors are configured to detect translation movements of the wheel, rim, or tire where the anti-theft alarm device is installed.

14. The anti-theft alarm system of claim 13, wherein the kinetic sensors comprise an accelerometer.

15. The anti-theft alarm system of claim 10, wherein the kinetic sensors are further configured to detect rotational movements of the wheel, rim, or tire where the anti-theft alarm device is installed.

16. The anti-theft alarm system of claim 15, wherein the kinetic sensors comprise a gyroscope.

17. The anti-theft alarm system of claim 10, further comprising a receiver of signals irradiated by satellite transmitters of a satellite global positioning system.

18. The anti-theft alarm system of claim 10, wherein the communication interface comprises a NarrowBand-IOT communication interface.

19. The anti-theft alarm system of claim 11, wherein the anti-theft alarm device is adapted to be embedded in a tire of a vehicle.

20. The anti-theft alarm system of claim 11, wherein the communication interface comprises a NarrowBand-IOT communication interface.

\* \* \* \* \*